United States Patent [19]

Eby

[11] 4,120,435
[45] Oct. 17, 1978

[54] EMERGENCY LIGHT BAR

[76] Inventor: George W. Eby, Rt. 1, Box 278A, Colton, Oreg. 97017

[21] Appl. No.: 718,169

[22] Filed: Aug. 27, 1976

[51] Int. Cl.² .............................................. B60N 11/00
[52] U.S. Cl. ................................................ 224/42.1 F
[58] Field of Search ............ 224/25 R, 25 A, 42.1 R, 224/42.1 G, 42.1 F, 42.45 R; 248/73

[56] References Cited

U.S. PATENT DOCUMENTS

| | | | |
|---|---|---|---|
| 2,584,292 | 2/1952 | Rogers | 224/42.1 F X |
| 3,281,030 | 10/1966 | Gosswiller | 224/42.1 F |
| 3,460,728 | 8/1969 | Adamson | 224/42.1 R |
| 3,522,921 | 8/1970 | Lytle | 248/73 X |
| 3,527,432 | 9/1970 | Lytle | 248/73 X |
| 3,677,451 | 7/1972 | Burland | 224/42.1 F |
| 3,789,358 | 1/1974 | Ellis | 224/42.1 R X |
| 3,858,774 | 1/1975 | Friis | 224/42.1 F |
| 3,944,177 | 3/1976 | Yoda | 248/73 X |

FOREIGN PATENT DOCUMENTS 366,464  2/1963  Switzerland ........................ 224/42.1 F Primary Examiner—Trygve M. Blix
Assistant Examiner—Winston H. Douglas
Attorney, Agent, or Firm—Kolisch, Hartwell, Dickinson & Stuart

[57] ABSTRACT

A bar and emergency warning unit assembly including a hollow bar of substantially channel-shaped cross section. A foot structure adjacent each end of the bar supports the assembly on the roof of a vehicle cab. A mounting for a foot structure securing it to the bar is effective to introduce rigidity to the bar. Hook mechanisms secure the assembly to the sides of a vehicle cab.

5 Claims, 9 Drawing Figures

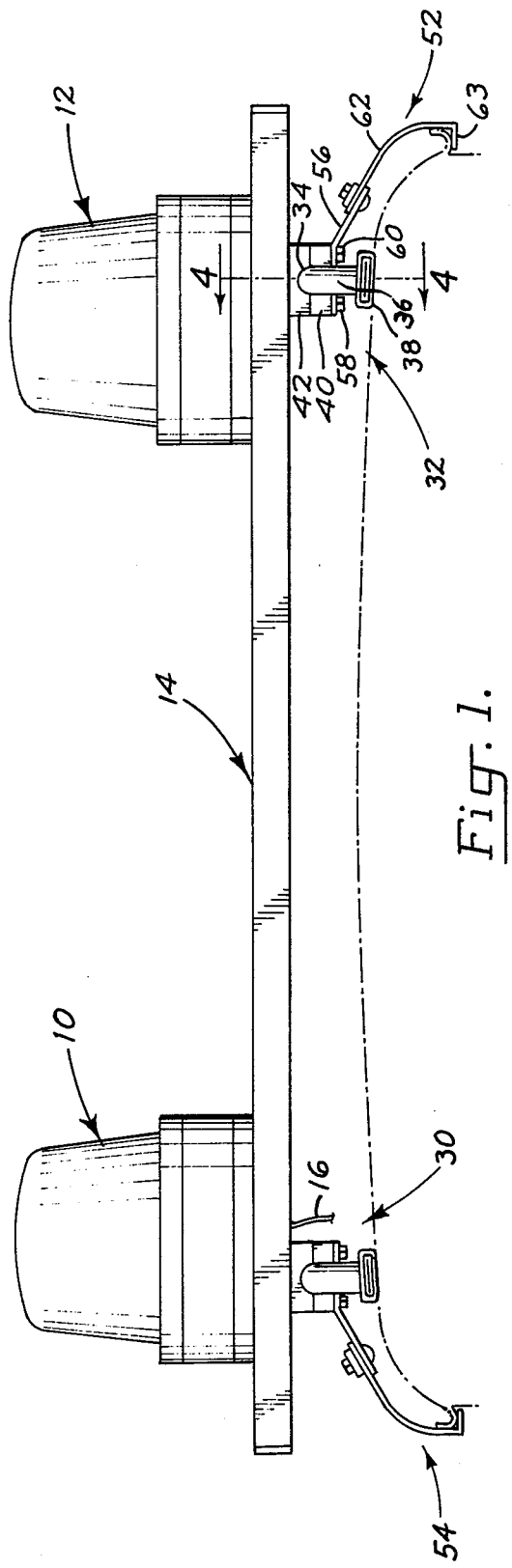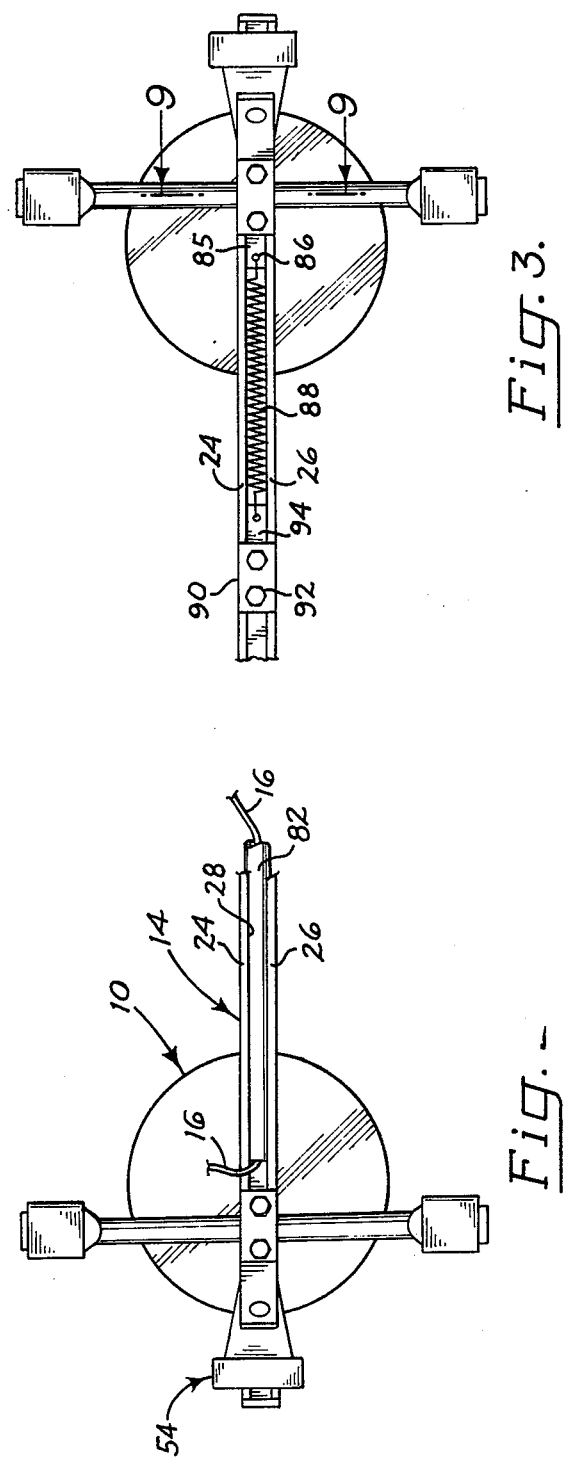

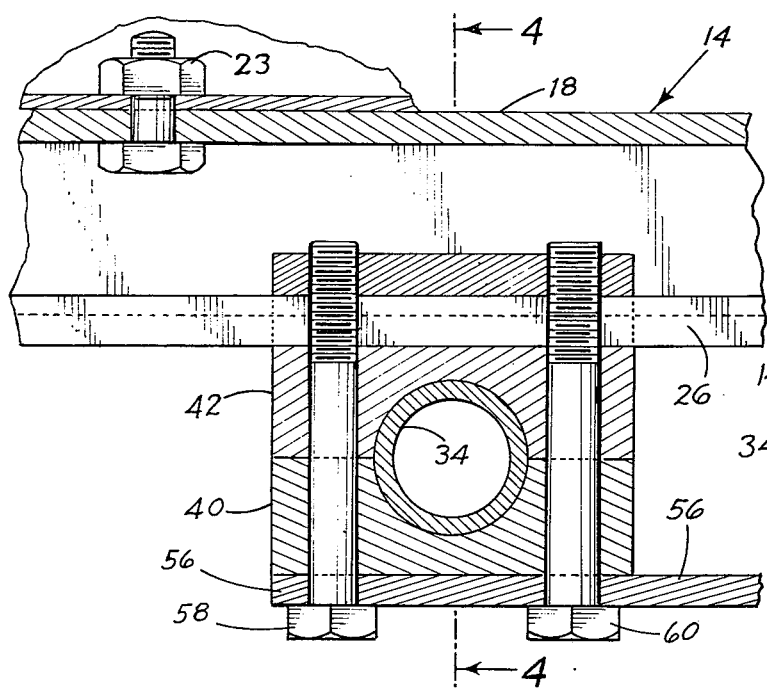
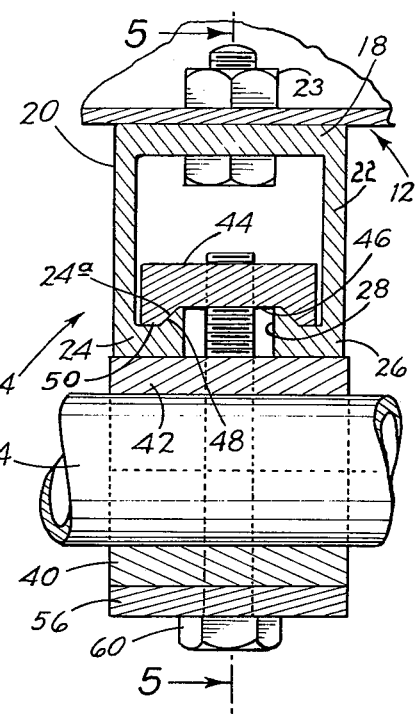
Fig. 5.   Fig. 4.
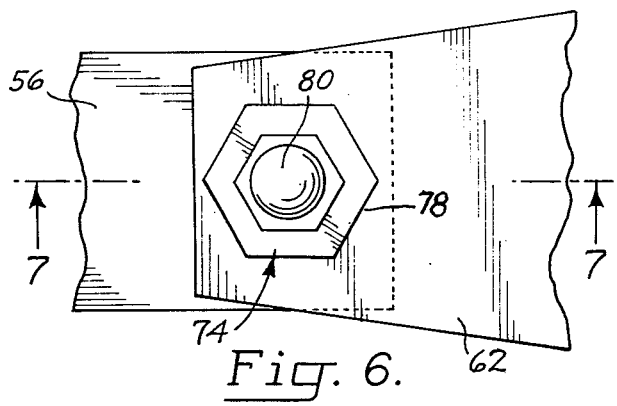
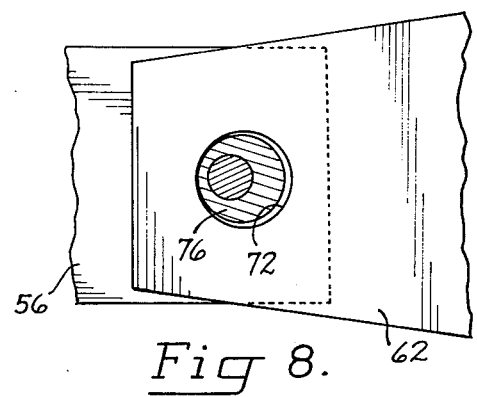
Fig. 6.   Fig. 8.
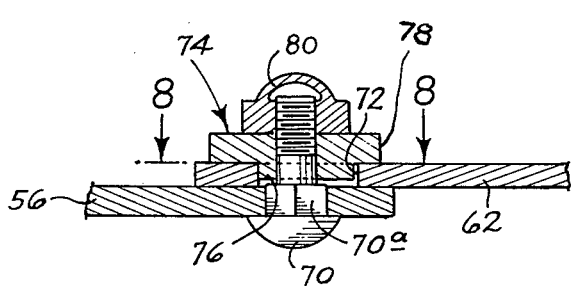
Fig. 7.
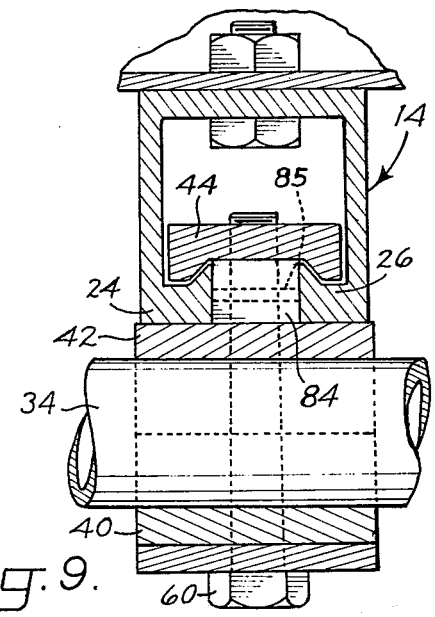
Fig. 9.

EMERGENCY LIGHT BAR

This invention relates generally to a bar or rack and emergency warning unit combination, of the type that is supported on the roof of a cab in a vehicle. Equipment of this description is used by law enforcement agencies as a means, for instance, of equiping a vehicle with the flashing signaling light associated with police cars and highway patrolmen. The equipment, of course, has other uses.

The bar and emergency light or warning device combination of the invention is adapted for detachable mounting on the roof of a vehicle cab, and incorporates foot structures which rest on the roof and hook mechanisms engaging the gutters or other protuberances normally found in a vehicle on its opposite sides and adjacent the roof.

Whereas police departments in the past tended to standardize on basic models of popularly priced American cars, presently there is a wide divergence between various departments, and even within a given department, as to the type of automobile employed in police work, with selections ranging from compact to full-sized American cars and even to foreign cars. As a consequence, it is important that an assembly adapted for roof mounting be capable of adjustment to accommodate the different roof sizes encountered.

Other considerations which are important in connection with this type of equipment are that the warning unit and bar be of relatively light mass, to accommodate their being installed on the top of an automobile, that the mounting on the automobile roof be secure, and such as to deter idle tampering, and that the entire assembly has adequate strength to withstand the relatively rough usage to which such equipment is subjected.

Generally, an object of this invention is to provide an improved emergency warning unit and mounting bar combination, which takes care of the above in a practical and satisfactory manner.

Another object is to provide such an assembly featuring a construction which readily adapts itself to mounting on widely different automobile roof sizes.

A further object is to provide such an assembly which is simply constructed and relatively light, while possessing excellent strength.

These and other objects and advantages are attained by the invention, which is described hereinbelow in conjunction with the accompanying drawings, wherein:

FIG. 1 is a side elevation illustrating a bar and emergency warning unit assembly according to an embodiment of the invention;

FIG. 2 is a bottom view of a portion of the assembly illustrated in FIG. 1;

FIG. 3 is a view similar to FIG. 2 but illustrating a modification of the invention;

FIG. 4 is a cross-sectional view taken generally along the line 4—4 in FIG. 1, on a somewhat enlarged scale, and illustrating how foot structure in the assembly is secured to the bar;

FIG. 5 is a cross-sectional view, taken generally along the line 5—5 in FIG. 4;

FIG. 6 is a view illustrating hook mechanism included in the assembly employed in securing the assembly to the vehicle;

FIG. 7 is a cross-sectional view, taken along the line 7—7 in FIG. 6;

FIG. 8 is a cross-sectional view taken along the line 8—8 in FIG. 7; and

FIG. 9 is a cross-sectional view, taken along the line 9—9 in FIG. 3, illustrating on a slightly enlarged scale further details of the modification shown in FIG. 3.

Referring to FIGS. 1 and 2, the assembly illustrated is of the type that might be installed on the roof of the cab in a police vehicle and includes a pair of emergency light units 10 and 12 mounted on the top of and disposed adjacent opposite ends of a bar or rack 14. Light units 10 and 12 are electrically powered, and are supplied with electrical current to energize them through an electrical conductor partially shown at 16.

Bar 14, and referring now to FIGS. 1, 2, 4 and 5, takes the form of an elongate, continuous, hollow bar of substantially channel-shaped cross section throughout its length. Thus, and specifically referring to FIG. 4, the bar includes an elongate web 18 extending along its length forming a closed top in the bar. Opposed flanges 20, 22 integral at upper margins with this web form opposite sides of the bar. Adjacent the base of the bar a pair of inwardly projecting elongate shoulders 24, 26 are present, such being joined to respective lower margins of the flanges. The shoulders have inner edges which are spaced from each other thus to define an elongate opening 28 extending along the base of the bar.

A light unit such as unit 12 is secured to web 18 of the bar with nut and bolt assemblies exemplified by assembly 23 shown in FIGS. 4 and 5.

It will be noted with reference to FIG. 4 that the shoulders 24, 26 have beveled upper sides, as exemplified at 24a, that slope downwardly progressing from their inner edges toward the flanges with which the shoulders join. Thus, each shoulder has a raised rib region extending therealong on its upper side, with an elongate trough defined intermediate this rib region and the flange with which the shoulder joins.

Bar 14, and referring again to FIGS. 1 and 2, is supported on the roof of the cab in the vehicle through foot structures indicated generally at 30, 32 which are mounted under the bar and are located adjacent opposite ends.

Each foot structure takes the form of an elongate tube segment 34 disposed transversely of the bar, of substantially bowed profile, and including depending legs such as leg 36 provided adjacent opposite extremities of the segment. Ends of the tube segment are flattened, and provided with pads 38. With the assembly mounted, these pads bear against the roof of the vehicle.

The mid region of the tube segment in a foot structure is encompassed by a pair of blocks 40, 42. These blocks have complementing semi-cylindrical recesses therein which receive the tube segment with the blocks assembled thereabout.

In the mounting of the foot structure on the under side of the bar, the upper block, i.e. block 42, rests against the under side of the bar and more specifically the under sides of shoulders 24, 26 forming the base of the bar. Disposed within the interior of the bar is a member 44 which rests on the upper sides of these shoulders.

It will be noted that member 44, viewing the cross section illustrated in FIG. 4, includes a central raised region 46 on its under side, beveled surfaces 48 extending downwardly from the raised region on either side thereof, and marginal surfaces 50 that are substantially horizontal. Thus, the member 44 has lower surface regions substantially complementing the configuration of the ribs and troughs provided on the upper sides of shoulders 24, 26.

The assembly is secured to the roof of the cab in a vehicle through hook mechanisms 52, 54 (see FIGS. 1 and 2), with one of such hook mechanisms being secured to each foot structure. Thus, with reference to hook mechanism 52 illustrated, the mechanism includes an upper part 56 which passes under lower block 40 of the foot structure. Securing this upper part to block 40, and also to block 42, and member 44 within the bar, are elongate bolts shown at 58, 60. These bolts pass through accommodating bores provided in part 56 and blocks 40, 42, and have upper threaded ends threadably received within internally threaded bores provided in member 44.

It will be noted from the above description that with tightening of the bolts 58, 60, the blocks 40, 42 are caused to clamp firmly against opposite sides of tube segment 34. Additionally, the upper side of block 42 is drawn tightly against the lower sides of shoulders 24, 26, and member 44 within the bar is drawn snugly down against the upper sides of the shoulders. Thus, block 42 and member 44 function as clamp members which in the assembled state shown in FIG. 4 function to clamp against opposite sides of the shoulders disposed therebetween.

The structure described in connection with the mounting of a foot structure on the under side of the bar may be loosened, which then enables the foot structure to be shifted on the under side of the bar to the position optimally desired for the mounting of the assembly on the roof of a particular vehicle. After properly being positioned, bolts 58, 60 are tightened to securely hold the foot structure in the position selected. It will further be noted that with the bolts tightened, and because of the complementing beveled surfaces provided, the shoulders and the flanges with which they join are positively held from lateral displacement, which materially contributes to the rigidity of the bar by inhibiting twisting or flexing.

Each hook mechanism, in addition to upper part 56 described, includes a lower part 62 overlapped at its upper extremity with part 56, and having a turned-in lower margin or lip 63 adapted to fit under the gutter or other protuberance normally found in a vehicle adjacent the roof.

As already pointed out, the foot structures are capable of being mounted in different adjusted positions on the under side of the bar to accommodate different vehicle sizes. It is also important, however, in the obtaining of a firmly mounted position on the vehicle cab, that means be provided to enable a hook structure to be drawn up thus to secure it with the protuberance that it engages.

To this end, and referring to FIGS. 6, 7 and 8, the upper and lower parts in the hook mechanism are joined together by a carriage bolt 70 with a squared portion 70a fitting within a complementing aperture provided in part 56. Lower part 62 includes a circular aperture 72. Fitting within this aperture and mounted about the shank of the carriage bolt is a member 74 including cam portion 76 eccentrically disposed with respect to the axis of the carriage bolt. Member 74 further includes hex head portion 78. A nut 80 is screwed onto the threaded end of the carriage bolt. From this it should be obvious that with loosening of the nut and with a tool secured to the hex head portion, cam portion 76 may be turned to affect relative extension or contraction of parts 56, 62. With the construction described, and with the bar mounted to span the roof of a vehicle cab, the hook mechanisms on either side may be drawn up to affect tight securement with a gutter.

Conductor 16 which supplies electrical energy to the light units may extend along the interior of the hollow bar to the location where electrical connection is made with the circuitry of the light unit. Where such extends in the bar, it is contemplated that such extend through the interior of a hollow elastomeric tube, such as the one partially shown at 82 in FIG. 2 which snugly fits within the hollow interior defined within the bar. Describing a specific embodiment, with the bar having a side-to-side dimension of approximately one inch, the tube may have in its relaxed state an outer diameter slightly exceeding this, i.e. one and one-eighth inch, and a wall thickness of one-eighth of an inch or so. By mounting the conductor in this manner, the same is maintained from falling out of the bar. Furthermore, with a slot defined along the base of the bar having a width of one-half inch or more, it is an easy matter with deformation of the tube to move the tube, and the conductor within it, into the interior of the bar through the slot.

In FIGS. 3 and 9, a modification of the invention is illustrated which is specifically designed for quick mounting and demounting, in an assembly intended primarily for temporary use on a vehicle. Thus, and referring to these figures, it is contemplated that one of the foot structures under the bar be slidably mounted thereon, and that a biasing spring be included tending to retract the structure inwardly to the extent required to produce proper fit.

Further describing this modification of the invention, there is provided between upper block 42 and member 44 within the bar a spacer block 84 having a height slightly exceeding the height of the inner edges of shoulders 24, 26. This spaces block 42 and member 44, whereby with tightening of bolts 58, 60, member 44 functions to confine the shoulders of the bar without making actual clamping contact therewith.

Block 84 further is provided, and referring also to FIG. 3, with a tab 85 extending inwardly on the bar having an aperture 86 therein which is used in the mounting one end of an elongate coiled spring 88. The spring extends inwardly on the bar and has its opposite end anchored to the bar at a point intermediate the two foot structures. Specifically, and with reference to FIG. 3, anchoring may be done by using a block such as the one shown at 90 which bears against the under sides of shoulders 24, 26. Cooperating with this block is another member (resembling member 44 described in connection with the mounting of a foot structure) that rests on the upper sides of the shoulders. These two members are secured together with bolts 92. Integral with member 90 is a tab 94 having an aperture therein used in the mounting of the inner end of the coil spring.

With this type of construction, block 90 and associated structure serve to clamp onto the shoulders of the bar and make it rigid in the same manner as block 42 and member 44 discussed in connection with the mounting of a fixed foot structure.

It will be noted that with this organization, the coil spring 88 extends the length of the bar occupying the space defined between the inner edges of shoulders 24, 26. In this way the hollow interior of the bar can be used in the mounting of a conductor housed within an elastomeric tube as already described, such seating within the bar in the space above the coil spring.

It should be obvious from the above description that the bar and warning unit assembly of the invention possesses a number of unique and desirable features. The entire assembly is relatively light in mass, with the bar, for instance, being suitably manufactured from an aluminum extrusion. Twisting and flexing in the bar is inhibited by the mounting selected for the foot structures, and the means selected for the anchoring of the inner end of the spring in the case of the modification illustrated in FIGS. 3 and 9. The assembly is easily adapted for installation on a wide range of roof sizes. When installed, the assembly may be securely mounted in place with minimal likelihood of loosening even under the severest operating conditions.

It is claimed and desired to secure by Letters Patent:

1. A bar and emergency warning unit assembly for vehicle mounting comprising
    a single elongate continuous hollow bar adapted to span the width of the roof of the cab of the vehicle having an elongate upper web, opposed side flanges integral at upper margins with said web, and a pair of opposed inwardly projecting elongate shoulders joined to respective lower margins of said flanges forming the bottom of the bar, said shoulders having inner edges spaced from each other to define an elongate opening extending along the base of the bar,
    an emergency warning unit mounted on the top of said bar,
    a foot structure under the bar for supporting the bar on the roof of a vehicle, the foot structure including an elongate segment extending transversely of said bar equipped with roof engaging pads,
    each of said shoulders along its upper side having a raised rib extending therealong with an elongate trough defined intermediate the rib and the flange to which the shoulder joins,
    clamp means joining the foot structure to said bar, said clamp means including an upper clamp member engaging the upper sides of said shoulders and having a lower surface region complementing the rib and trough of each shoulder, and a lower clamp member engaging the undersides of said shoulders, said segment of the foot structure extending under said lower clamp member, said clamp means further including a block supporting the underside of said segment opposite said lower clamp member, the trough and raised ribs of said shoulders and the complementing lower surface region of the upper clamp member being effective to contribute to the rigidity of the bar by inhibiting twisting and flexing of the bar,
    and hook mechanism adapted to engage a protuberance on a vehicle 2. The assembly of claim 1, which further includes an elongate conductor means extending within the bar for energizing the emergency warning unit, an elastomeric tube having said conductor means being threaded through the hollow interior thereof and fitting snugly within the bar, said tube being deformable in cross section to permit entry into the bar through the elongate opening defined between said flanges.

3. An emergency warning unit and mounting bar assembly adapted for vehicle mounting comprising
    a single elongate continuous hollow bar adapted to span the width of the roof of the cab in a vehicle having an elongate upper web, opposed side flanges integral at upper margins with said web, and a pair of opposed inwardly projecting elongate shoulders joined to respective lower margins of said flanges forming the bottom of the bar which shoulders have inner edges spaced from each other to define an elongate opening extending along the base of the bar,
    each of said shoulders along its upper side having a raised rib extending therealong with an elongate trough defined intermediate the rib and the flange to which the shoulder joins,
    an emergency warning unit mounted on the top of said bar,
    a fixed foot structure under the bar adjacent one end thereof for supporting the bar on the roof of a vehicle, said foot structure being joined to said bar through clamp means including an upper clamp member engaging the upper sides of said shoulders with a lower surface region complementing the rib and trough in each of said shoulders and a lower clamp member engaging the under sides of said shoulders,
    a sliding foot structure under the bar adjacent its opposite end for supporting the bar on the roof of a vehicle, said sliding foot structure being mounted on said bar through an upper side member slideable over the upper sides of said shoulders and having a lower surface region complementing the rib and trough of each of said shoulders and a lower slide member slideable under the undersides of said shoulders,
    the trough and raised ribs of said shoulders and the complementing lower surface regions of said upper clamp member and said slide member being effective to contribute to the rigidity of the bar by inhibiting twisting and flexing of the bar,
    an elongate spring joined at one end to said sliding foot structure and extending inwardly on the bar to an opposite end located intermediate said foot structures, and
    an anchor for said opposite end joined to said bar.

4. The assembly of claim 3, wherein said anchor for said opposite end of the spring comprises an upper clamp member engaging the upper sides of said shoulders with a lower surface region complementing the rib and trough in each of said shoulders and a lower clamp member engaging the undersides of said shoulders.

5. The assembly of claim 3, wherein said spring extends inwardly on the bar occupying the space defined between said shoulders, and which further includes an elongate electric conductor for energizing the warning unit, said conductor being threaded through the interior of a hollow elastomeric tube fitting snugly within the bar and disposed above said spring, said tube being deformable in cross section to permit entry into the bar through the elongate opening defined between said flanges.

* * * * *